United States Patent Office 2,907,762
Patented Oct. 6, 1959

2,907,762
NEW ANTHRAQUINONOID DYESTUFFS

Robert Norman Heslop, Manchester, England, assignor to Imperial Chemical Industries Limited, London, England, a corporation of Great Britain No Drawing. Application November 25, 1955
Serial No. 549,175

Claims priority, application Great Britain November 29, 1954

7 Claims. (Cl. 260—249)

This invention relates to new anthraquinonoid dyestuffs and more particularly it relates to new anthraquinonoid dyestuffs which possess excellent solubility and are valuable for the production of fast colourations on cellulosic textile materials.

According to our invention we provide new anthraquinonoid dyestuffs which, in the form of their free acids are of the formula:

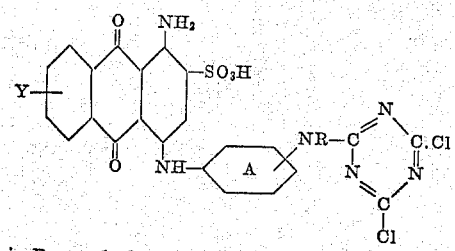

wherein R stands for a hydrocarbon or substituted hydrocarbon radical, and Y stands for hydrogen or for a sulphonic acid group, and the phenlyene radical A may be further substituted.

According to our invention we also provide a process for the manufacture of the said new anthraquinonoid dyestuffs which comprises reacting together an aminoanthraquinone compound which, in the form of its free acid, is of the formula:

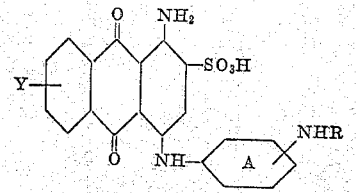

wherein A, Y, and R have the meanings stated above, with one molecular proportion of cyanuric chloride.

The aminoanthraquinone compounds for use in the process of our invention may conveniently be used in the form of their alkali metal salts, for example their sodium salts, and may be obtained by reaction of a compound of the formula:

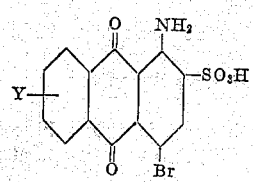

wherein Y has the meaning stated above with an aromatic diamine of the formula:

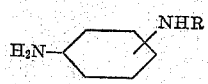

wherein R has the meaning stated above, and which may be further substituted, under known conditions for example in aqueous alkaline medium.

As examples of further groups which may be present in the phenylene radical A there may be mentioned ionogenic solubilising groups for example —$CO_2H$ and —$SO_3H$.

As examples of aromatic diamines there may be mentioned N-methyl-m-phenylene diamine, N-methyl-p-phenylenediamine, 2-methylamino-5-aminobenzene sulphonic acid, 2-methylamino-4-aminobenzenesulphonic acid, 2-methylamino - 5 - aminobenzoic acid, 2 - n-butylamino-5-aminobenzene sulphonic acid, 2-cyclohexylamino-5-amino-benzene sulphonic acid, and N-($\beta$-hydroxyethyl)-m-phenylene diamine.

The radical represented by R in the above formulae may be for example alkyl, aralkyl or cycloalkyl, any of which may optionally carry substituents.

The reaction of the said aminoanthraquinone compounds with cyanuric chloride may be carried out for example and preferably in aqueous medium, and preferably at a temperature below 5° C.

In order that side reactions, for example hydrolysis, of the chlorine atoms attached to the triazine ring are minimised during manufacture and storage, it is generally preferable to isolate the new dyestuffs from the media in which they have been formed at a pH of from 6 to 8, and to dry the resultant dyestuff pastes at relatively low temperatures, for example between 20° and 40 C., preferably in the presence of buffering agents suitable for maintaining a pH value of about 6.5. Examples of such buffering agents are mixtures of sodium dihydrogen phosphate and disodium hydrogen phosphate or of disodium hydrogen phosphate and potassium dihydrogen phosphate.

The dyestuffs of this invention, in the form of their alkali metal salts, are readily soluble in water, and are especially suitable for application to cellulosic textile materials by a process which comprises impregnating the textile materials in aqueous medium with the dyestuff and thereafter subjecting the textile materials, optionally after drying, to the action of an acid binding agent for example caustic soda, in aqueous medium which advantageously contains an added electrolyte such as sodium chloride, for a short period of time at a temperature between atmospheric temperatures and the boiling point of the solution. The dyestuffs are also useful for the printing of cellulosic textile materials by a process which comprises applying thereto a printing paste containing the dyestuff and a substance which, on heating or steaming, liberates an acid binding agent, for example sodium bicarbonate, and subsequently subjecting the textile material to the action of heat or steam.

The blue colourations thus produced possess a high degree of fastness to light and to wet treatments, especially to bleach and to repeated washing. Furthermore, the colourations show good stability towards acids and alkalies.

The invention is illustrated but not limited by the following examples in which the parts are by weight:

Example 1

A solution of 5.07 parts of cyanuric chloride in 26 parts of acetone is added gradually to a stirred mixture of 100 parts of water and 100 parts of crushed ice. To the stirred suspension of cyanuric chloride thus obtained there is added during 45 minutes a solution containing 16.2 parts of the trisodium salt of 1-amino-4-(4'-methylaminoanilino)-anthraquinone-2:3':5-trisulphonic acid in 250 parts of water, while the temperature of the reaction mixture is maintained between 0° and 2° C. The mixture is stirred for a further 15 minutes, and then sufficient 2 N aqueous sodium carbonate solution is added gradually during 30 minutes to render the reaction mixture neutral to litmus. A solution of 11.4 parts of disodium hydrogen phosphate and 7.2 parts of potassium dihydrogen phosphate in 100 parts of water is added and the mixture is stirred for 10 minutes. Sufficient sodium chloride to give a concentration of 170 grams per litre is then added and the mixture is stirred for 3 hours when separation of the dyestuff is complete. The mixture is then filtered and the solid on the filter is washed with a solution containing 75 parts of sodium chloride, 11.4 parts of disodium hydrogen phosphate and 7.2 parts of potassium dihydrogen phosphate in 500 parts of water and finally dried at room temperature.

The product is a dark blue powder which is readily soluble in water. Cotton or viscose treated with an aqueous solution of the product and then with an acid binding agent, for example a solution of caustic soda, is dyed a reddish-blue shade possessing high fastness to light and to wet treatments.

*Example 2*

A solution of 6.75 parts of cyanuric chloride in 36 parts of acetone is added gradually to a stirred mixture of 100 parts of water and 100 parts of crushed ice. To the stirred suspension of cyanuric chloride thus obtained there is added during 1 hour a solution containing 18.2 parts of the disodium salt of 1-amino-4-(4'-methylaminoanilino)-anthraquinone-2:3'-disulphonic acid in 300 parts of water, while the temperature of the reaction mixture is maintained between 0° and 2° C. The reaction mixture is stirred for a further 30 minutes at the same temperature and then sufficient 2 N sodium carbonate solution is added gradually during 30 minutes to render the mixture neutral to litmus. A solution of 11.4 parts of disodium hydrogen phosphate and 7.2 parts of potassium dihydrogen phosphate in 100 parts of water is added, the mixture is stirred for 10 minutes, and then sufficient sodium chloride to give a concentration of 120 grams per litre is added. The mixture is stirred for 3 hours when precipitation of the dyestuff is complete, and then filtered. The solid on the filter is washed with a solution containing 60 parts of sodium chloride, 11.4 parts of disodium hydrogen phosphate and 7.2 parts of potassium dihydrogen phosphate in 500 parts of water and finally dried at room temperature.

The product is a dark blue powder which is soluble in water. Cotton or viscose treated with an aqueous solution of the product, and then treated with an acid-binding agent, for example a solution of caustic soda, is dyed a reddish blue shade possessing high fastness to light and to wet treatments.

*Example 3*

A solution of 5.0 parts of cyanuric chloride in 28 parts of acetone is added gradually to a stirred mixture of 100 parts of water and 100 parts of crushed ice. To the stirred suspension of cyanuric chloride thus obtained, there is added during 45 minutes a solution of 14.7 parts of the disodium salt of 1-amino-4-(4'-n-butylaminoanilino)-anthraquinone-2:3'-disulphonic acid in 300 parts of water, while the temperature of the reaction mixture is maintained between 0° and 4° C. The reaction mixture is stirred a further 45 minutes at 0° to 4° C. and then sufficient 10% sodium carbonate solution is added gradually to render the reaction mixture neutral to litmus. A solution of 6 parts of anhydrous disodium hydrogen phosphate and 12 parts of anhydrous potassium dihydrogen phosphate in 100 parts of water is added to the mixture and then sufficient sodium chloride to give a concentration of 100 gm. per litre is added. After stirring a further 20 minutes, the mixture is filtered and the cake washed on the filter with a solution of 20 parts of sodium chloride, 3 parts of anhydrous disodium hydrogen phosphate and 6 parts of anhydrous potassium dihydrogen phosphate in 200 parts of water and finally dried at atmospheric temperature. The product is a dark blue powder which is readily soluble in water. Cotton or viscose treated with an aqueous solution of the product and then with an acid binding agent, for example a solution of caustic soda, is dyed a reddish-blue shade possessing high fastness to light and wet treatments.

*Example 4*

A solution of 5.0 parts of cyanuric chloride in 28 parts of acetone is added gradually to a stirred mixture of 100 parts of water and 100 parts of crushed ice. To the stirred suspension of cyanuric chloride thus obtained there is added over approximately 1 hour a solution of 15.4 parts of the disodium salt of 1-amino-4-(4'-cyclohexylamino-anilino)-anthraquinone-2:3'-disulphonic acid in 300 parts of water, the temperature of the reaction mixture being allowed to rise to 15° to 20° C. during this addition. The reaction mixture is stirred at 18° to 19° C. for a further 1½ hours and then sufficient 10% sodium carbonate solution is added gradually to render the reaction mixture neutral to litmus. A solution of 6 parts of anhydrous disodium hydrogen phosphate and 12 parts of anhydrous potassium dihydrogen phosphate in 100 parts of water is added and then sufficient sodium chloride to give a concentration of 80 gm. per litre is added to the reaction mixture. The mixture is stirred at room temperature for 45 minutes and then filtered and the solid on the filter is washed with a solution of 16 parts of sodium chloride, 3 parts of anhydrous disodium hydrogen phosphate and 6 parts of anhydrous potassium dihydrogen phosphate in 200 parts of water and finally dried at room temperature. The product is a dark blue powder which is readily soluble in water. Cotton or viscose treated with an aqueous solution of the product and then with an acid binding agent, for example a solution of caustic soda, is dyed a reddish-blue shade possessing high fastness to light and to washing treatments.

*Example 5*

A solution of 5.0 parts of cyanuric chloride in 28 parts of acetone is added gradually to a stirred mixture of 100 parts of water and 100 parts of crushed ice. To the stirred suspension of cyanuric chloride thus obtained, there is added over 45 minutes a solution of 12.8 parts of the disodium salt of 1-amino-4-(4'-methylamino-3'-carboxy-anilino)-anthraquinone-2-sulphonic acid in 300 parts of water, while the temperature of the reaction mixture is maintained between 0° and 4° C. The reaction mixture is stirred a further 45 minutes at 0° to 4° C. and then sufficient 10% sodium carbonate solution is added gradually to render the mixture neutral to litmus. A solution of 6 parts of anhydrous disodium hydrogen phosphate and 12 parts of anhydrous potassium dihydrogen phosphate in 100 parts of water is added, and the mixture is stirred for 10 minutes, after which time sufficient sodium chloride to give a concentration of 60 gm. per litre is added. The mixture is stirred a further 30 minutes and then filtered and the solid is washed on the filter with a solution of 30 parts of sodium chloride, 6 parts of anhydrous disodium hydrogen phosphate and 12 parts of anhydrous potassium dihydrogen phosphate in 500 parts of water and finally dried at room temperature. The product is a dark blue powder which is readily soluble in water. Cotton or viscose treated with an aqueous solution of the product and then with an acid-binding agent, for example a solution of caustic soda, is dyed a blue shade possessing high fastness to light and wet treatments.

*Example 6*

A solution of 4.0 parts of cyanuric chloride in 20 parts of acetone is added gradually to a stirred mixture of 100 parts of water and 100 parts of crushed ice. To the stirred suspension of cyanuric chloride so obtained, there is added during 1 hour a solution of 11.54 parts of the disodium salt of 1-amino-4-[3'(β-hydroxyethylamino)-anilino]-anthraquinone-2:5-disulphonic acid in 300 parts of water while the temperature of the reaction mixture is maintained between 0° and 2° C. The mixture is stirred at the same temperature for a further 1 hour and then sufficient 10% sodium carbonate solution is added gradually to render the reaction mixture neutral to litmus. A solution of 6 parts of anhydrous disodium hydrogen phosphate and 12 parts of anhydrous potassium dihydrogen phosphate in 100 parts of water is added, the mixture is stirred for a few minutes, and then sufficient sodium chloride to give a concentration of 80 gm. per litre is added. The mixture is stirred for approximately 1 hour and then filtered and the solid on the filter is washed with a solution of 20 parts of sodium chloride, 3 parts of anhydrous disodium hydrogen phosphate and 6 parts of anhydrous potassium dihydrogen phosphate in 250 parts of water and finally dried at room temperature. The product is a dark blue powder which is readily soluble in water. Cotton or viscose treated with an aqueous solution of the product and then with an acid-binding agent, for example a solution of caustic soda, is dyed a reddish-blue shade possessing high fastness to light and to wet treatments.

What I claim is:

1. New anthraquinonoid dyestuffs which are of the formula:

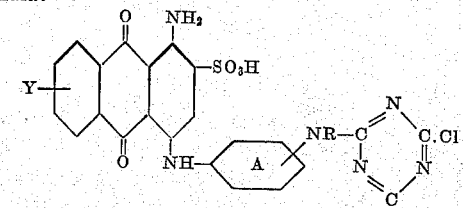

wherein R is selected from the group consisting of cyclohexyl, alkyl of from 1 to 4 carbon atoms, and hydroxyalkyl of from 1 to 4 carbon atoms, and Y is selected from the group consisting of hydrogen and sulfonic acid group and the aromatic radical A is selected from the group consisting of phenylene, carboxy-phenylene and sulfo-phenylene.

2. 1 - amino - 4 - [4' - (N - methyl-4":6"-dichlorotriazinylamino) - anilino] - -anthraquinone - 2:3':5 - trisulfonic acid.

3. 1 - amino - 4 - [4' - (N - methyl - 4":6" - dichlorotriazinylamino) - anilino] - anthraquinone - 2:3' - disulfonic acid.

4. 1 - amino - 4 - [4' - (N - n - butyl - 4":6" - dichlorotriazinylamino) - anilino] - anthraquinone - 2:3' - disulfonic acid.

5. 1 - amino - 4 - [4' - (N - cyclohexyl - 4":6" - dichlorotriazinylamino) - anilino] - anthraquinone - 2:3'-disulfonic acid.

6. 1 - amino - 4 - [3' - carboxy - 4' - (N - methyl-4":6" - dichlorotriazinylamino) - anilino] - anthraquinone-2-sulfonic acid.

7. 1 - amino - 4 - [3'-(N-β-hydroxyethyl-4":6"-dichlorotriazinylamino) - anilino]-anthraquinone-2:5-disulfonic acid.

References Cited in the file of this patent

UNITED STATES PATENTS

| 1,802,208 | Hoffa et al. | Apr. 21, 1931 |
| 1,886,480 | Haller et al. | Nov. 8, 1932 |
| 2,000,121 | Bush | May 7, 1935 |
| 2,093,424 | Dove | Sept. 21, 1937 |
| 2,339,739 | Blackshaw et al. | Jan. 18, 1944 |
| 2,722,527 | Wehrli et al. | Nov. 1, 1955 |
| 2,740,796 | Singer et al. | Apr. 3, 1956 |

FOREIGN PATENTS

| 1,110,925 | France | Oct. 19, 1955 |
| 467,815 | Great Britain | June 23, 1937 |